(12) United States Patent
Wu et al.

(10) Patent No.: US 11,650,846 B2
(45) Date of Patent: May 16, 2023

(54) METHOD, DEVICE, AND COMPUTER PROGRAM PRODUCT FOR JOB PROCESSING

(71) Applicant: EMC IP Holding Company LLC, Hopkinton, MA (US)

(72) Inventors: Pengfei Wu, Shanghai (CN); YuHong Nie, Shanghai (CN); Jinpeng Liu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 424 days.

(21) Appl. No.: 16/797,794

(22) Filed: Feb. 21, 2020

(65) Prior Publication Data
US 2021/0165684 A1    Jun. 3, 2021

(30) Foreign Application Priority Data
Nov. 28, 2019   (CN) .......................... 201911187925.0

(51) Int. Cl.
| | |
|---|---|
| *G06F 9/46* | (2006.01) |
| *G06F 9/48* | (2006.01) |
| *G06F 9/54* | (2006.01) |
| *H04L 9/32* | (2006.01) |

(Continued)

(52) U.S. Cl.
CPC .......... *G06F 9/4881* (2013.01); *G06F 9/5027* (2013.01); *G06F 9/546* (2013.01); *H04L 9/0637* (2013.01); *H04L 9/3234* (2013.01)

(58) Field of Classification Search
CPC ...... G06F 9/4881; G06F 9/5027; G06F 9/546; H04L 9/0637; H04L 9/3234
See application file for complete search history.

(56) References Cited

U.S. PATENT DOCUMENTS

| | | | |
|---|---|---|---|
| 8,843,929 B1 * | 9/2014 | Oppenheimer ....... | G06F 9/5044 718/102 |
| 11,281,967 B1 * | 3/2022 | Volpe ..................... | G06N 3/049 |

(Continued)

OTHER PUBLICATIONS

Li et al., A Novel Multi-link Integrated Factor Algorithm Considering Node Trust Degree for Blockchain-based Communication, KSII, vol. 11, No. 8, Aug. 2017, pp. 3766-3788.*

(Continued)

*Primary Examiner* — Diem K Cao
(74) *Attorney, Agent, or Firm* — Ryan, Mason & Lewis, LLP

(57) ABSTRACT

The present disclosure relates to a method, device and computer program product for processing a job. In a method, a first group of tasks in a first portion of a job are obtained based on a job description of the job from a client. The first group of tasks are allocated to a first group of processing devices in a distributed processing system, respectively, so that the first group of processing devices generate a first group of task results of the first group of tasks, respectively, the first group of processing devices being located in a first processing system based on a cloud and a second processing system based on blockchain. The first group of task results of the first group of tasks are received from the first group of processing devices, respectively. A job result of the job is generated at least partly based on the first group of task results.

20 Claims, 11 Drawing Sheets

(51) Int. Cl.
      H04L 9/06          (2006.01)
      G06F 9/50          (2006.01)

(56) References Cited

U.S. PATENT DOCUMENTS

| | | | | |
|---|---|---|---|---|
| 2015/0160969 A1* | 6/2015 | Kishore | ............. | G06F 11/3006 |
| | | | | 718/102 |
| 2019/0370058 A1* | 12/2019 | Gupta | .................... | G06F 9/466 |
| 2020/0076884 A1* | 3/2020 | Li | ........................ | H04L 67/108 |
| 2020/0310929 A1* | 10/2020 | Li | ....................... | G06F 11/1637 |

OTHER PUBLICATIONS

Gil et al., Task scheduling scheme based on resource clustering in desktop grids, John Wiley & Son, Ltd, 2013, 13 pages.*
Celaya et al., Distributed Scheduler of Workflows with Deadlines in a P2P Desktop Grid, IEEE, 5 pages (Year: 2010).*
Spark.apache.org, "Apache Spark—Unified Analytics Engine for Big Data," https://spark.apache.org/, 2018, 4 pages.
Blockchain.com, "The Most Trusted Crypto Company," https://www.blockchain.com/, 2019, 10 pages.
Wikipedia, "Verifiable Computing," https://en.wikipedia.org/wiki/Verifiable_computing, Dec. 4, 2019, 4 pages.
B. Parno et al., "Pinocchio: Nearly Practical Verifiable Computation," IEEE Symposium on Security and Privacy, May 19-22, 2013, pp. 238-252.

* cited by examiner

METHOD, DEVICE, AND COMPUTER PROGRAM PRODUCT FOR JOB PROCESSING

RELATED APPLICATION(S)

The present application claims priority to Chinese Patent Application No. 201911187925.0, filed Nov. 28, 2019, and entitled "Method, Device, and Computer Program Product for Job Processing," which is incorporated by reference herein in its entirety.

FIELD

Various implementations of the present disclosure relate to job processing, and more specifically, to a method, device and computer program product for processing a job in a distributed way.

BACKGROUND

With the development of distributed processing technology, a cloud service architecture with distributed processing capabilities has been proposed. The cloud service architecture may be provided by a cloud service vendor to process jobs from clients. According to the description of a job, the job may be divided into one or more portions, and each portion may be divided into a plurality of tasks. Here, the plurality of tasks may run on a plurality of processing devices in the cloud architecture in parallel. The plurality of processing devices may return their respective processing results to generate a final job result for the job.

Generally, the cloud service vendor has a large number of processing devices with powerful processing capabilities and may provide reliable services in terms of security and processing speed. In a network environment, there currently exist many persons and/or small organizations having idle processing devices. These idle processing devices may be connected to the network environment to provide users with processing services. However, since persons and/or small organizations do not have the capability to build a cloud service architecture, and mass users do not trust the processing devices provided by them, the idle processing capabilities in the network environment cannot be utilized effectively. Therefore, it has become a focus of research for managing processing devices in a more reliable and effective way so as to provide the job processing capability.

SUMMARY

Therefore, it is desirable to develop and implement a technical solution for processing a job more effectively. It is desired that the technical solution be compatible with existing technical solutions for distributed processing and process jobs will be handled more effectively by reconstructing configurations of existing distributed processing systems.

According to a first aspect of the present disclosure, a method is provided for processing a job. In the method, a first group of tasks in a first portion of a job are obtained based on a job description of the job from a client. The first group of tasks are allocated to a first group of processing devices in a distributed processing system, respectively, so that the first group of processing devices generate a first group of task results of the first group of tasks, respectively, the first group of processing devices being located in a first processing system based on a cloud and a second processing system based on blockchain. A first group of task results of the first group of tasks are received from the first group of processing devices, respectively. A job result of the job is generated at least partly based on the first group of task results. By means of the method, it is possible to make sufficient use of various types of processing devices in the distributed processing system to improve the efficiency of job processing.

According to a second aspect of the present disclosure, an electronic device is provided, the electronic device comprising: at least one processor; and a memory coupled to the at least one processor, the memory having instructions stored thereon, the instructions, when executed by the at least one processor, causing the device to perform acts. The acts include: obtaining a first group of tasks in a first portion of a job based on a job description of the job from a client; allocating the first group of tasks to a first group of processing devices in a distributed processing system, respectively, so that the first group of processing devices generate a first group of task results of the first group of tasks, respectively, the first group of processing devices being located in a first processing system based on a cloud and a second processing system based on blockchain; receiving a first group of task results of the first group of tasks from the first group of processing devices, respectively; and generating a job result of the job at least partly based on the first group of task results.

According to a third aspect of the present disclosure, a computer program product is provided. The computer program product is tangibly stored on a non-transitory computer-readable medium and comprises machine-executable instructions which are used to implement a method according to the first aspect of the present disclosure.

BRIEF DESCRIPTION OF THE DRAWINGS

Through a more detailed description in the accompanying drawings, features, advantages and other aspects of the implementations, the present disclosure will become more apparent. Several implementations of the present disclosure are illustrated schematically and are not intended to limit the present invention. In the drawings.

DETAILED DESCRIPTION

The preferred implementations of the present disclosure will be described in more detail with reference to the drawings. Although the drawings illustrate the preferred implementations of the present disclosure, it should be appreciated that the present disclosure can be implemented in various ways and should not be limited to the implementations explained herein. On the contrary, the implementations are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first," "second" and so on can refer to same or different objects. The following text can also comprise other explicit and implicit definitions.

Figure 1:
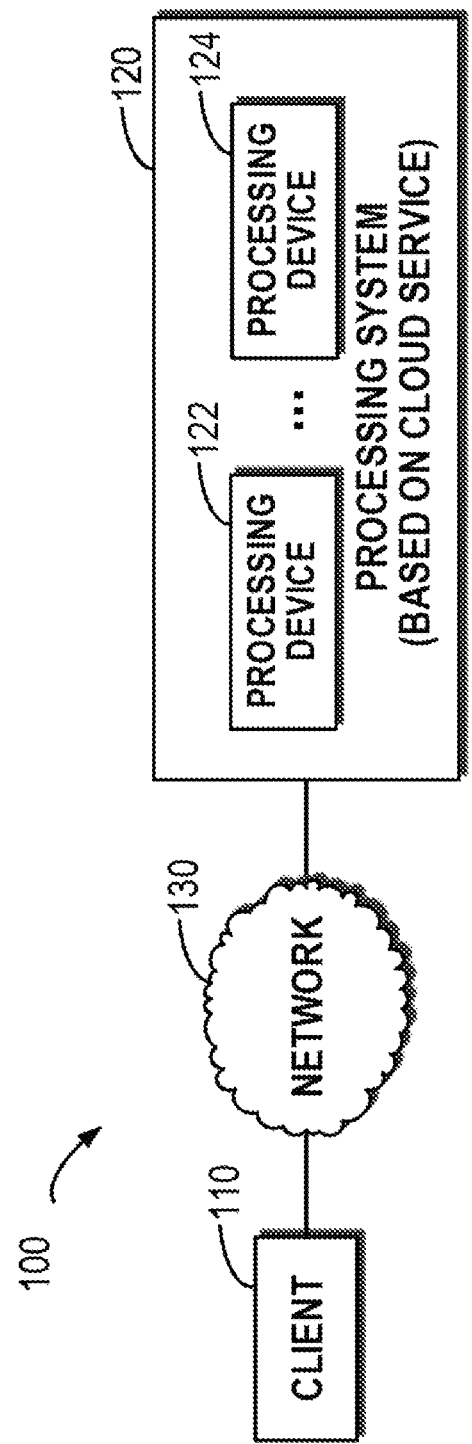
FIG. 1 schematically shows a block diagram of an application environment for processing a job according to one technical solution.

A processing system based on cloud services has emerged. With reference to FIG. 1, a brief description is presented below of a processing system based on cloud services. FIG. 1 schematically shows a block diagram of an application environment 100 for processing jobs according to one technical solution. A client 110 may process tasks by means of computing capabilities in a processing system 120 based on cloud services. In general, a cloud service vendor may provide the processing system 120 based on cloud services. The processing system 120 may comprise a plurality of processing devices 122, . . . , and 124. The cloud service vendor has powerful technical and economic strength and thus can build a separate processing system by itself.

The client 110 may use processing capabilities of various processing devices in the processing system 120 via a network 130. For example, the client 110 may send a job description of a to-be-processed job to the processing system 120 so as to invoke processing capabilities of the plurality of processing devices 122, . . . , and 124 to execute the job. A variety of engines for implementing distributed processing are available. These engines may be deployed in the processing system 120 and used to divide a received job into a plurality of tasks which are to be executed in parallel or in series.

Besides the large processing system provided by the cloud service vendor, in a network environment there further exist a large number of persons and/or small organizations having idle processing devices. However, since persons and/or small organizations lack the capability to build a cloud service architecture, and mass users do not trust processing devices provided by them, idle processing capabilities in the network environment cannot be effectively utilized. It is desirable to manage various processing devices in the network environment in a more reliable and effective way so as to provide the job processing capability.

Figure 2:
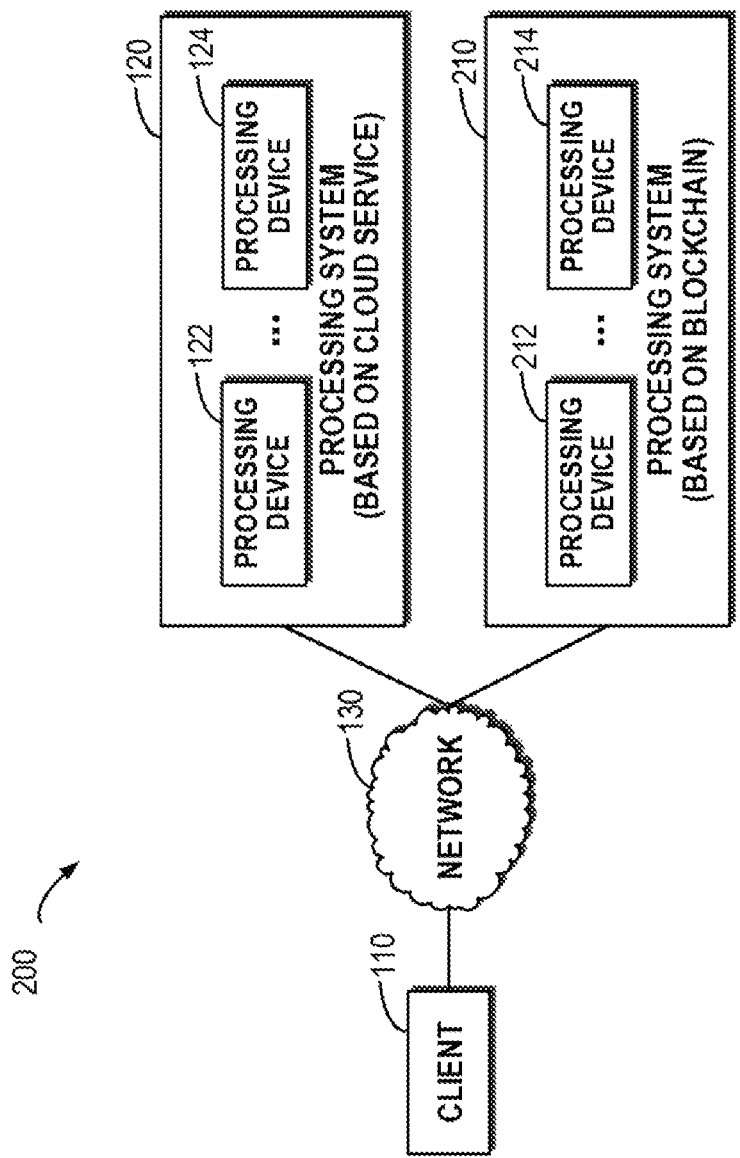
FIG. 2 schematically shows a block diagram of an application environment in which example implementations of the present disclosure may be implemented.

FIG. 2 schematically shows a block diagram of an application environment 200 in which example implementations of the present disclosure may be implemented. In the network environment there may further exist processing devices 212, . . . , 214 and the like, which may come from persons and/or small organizations. In FIG. 2, the processing devices 212, . . . , and 214 may join in a blockchain based processing system 210 to form computing nodes in the processing system 210. Since users do not trust the processing devices 212, . . . , and 214, idle processing capabilities in these processing devices cannot be utilized.

To solve the above drawbacks, implementations of the present disclosure provide a method for processing a job. The method may utilize processing devices in a plurality of processing systems to process a job. In this way, it is possible to make more use of idle processing resources from the cloud service vendor and other persons and/or small organizations.

Figure 3:
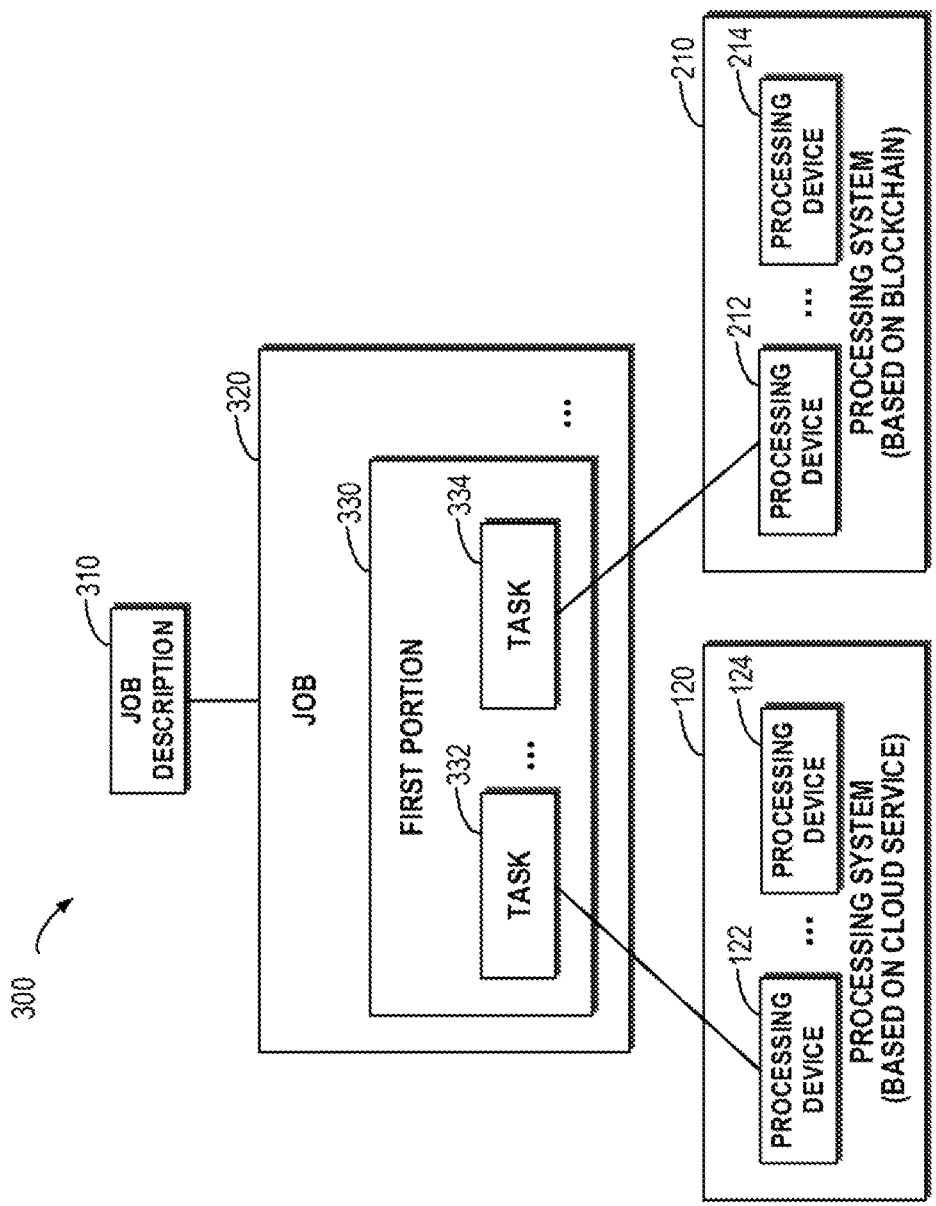
FIG. 3 schematically shows a block diagram of the procedure for processing a job according to example implementations of the present disclosure.

First, a brief example implementation of the present disclosure will be described with reference to FIG. 3. This figure schematically shows a block diagram 300 of the process for processing a job according to example implementations of the present disclosure. As depicted, a job description 310 may be received by a client, here the job description 310 defines various information about the job, e.g., an operation to be performed, data to be processed, etc. Based on information defined in the job description 310, one or more portions of the job 320 may be obtained (FIG. 3 shows only a first portion 330, but there may further exist a second portion, etc.). Further, a group of tasks 332, . . . , and 334 in the first portion 330 may be obtained. It will be understood that here the group of tasks 332, . . . , and 334 are a group of tasks which may be executed in parallel. Suppose the job description 310 defines that it is desirable to calculate the sales revenue of a certain product in a year, at this point 12 tasks may be obtained, and each task involves calculating the sales revenue of the product each month. It will be understood that there is no limit to the ways of obtaining the group of tasks here, but the group of tasks may be obtained by directly dividing the job based on the job description 310 or may be obtained from an existing engine.

To execute the group of tasks in parallel, the group of tasks may be allocated to a group of processing devices in a distributed processing system, so that the group of processing devices generate a group of task results for the group of tasks, respectively. Here the group of processing devices reside in a first processing system based on a cloud (e.g., the processing system 120) and a second processing system based on blockchain (e.g., the processing system 210). As shown in FIG. 3, here the group of processing devices may comprise the processing device 122, . . . , and the processing device 212, and the processing device 122 may reside in the processing system 120 while the processing device 212 may reside in the processing system 210.

It will be understood that the group of processing devices 122, . . . and 212 may process the allocated tasks in parallel and return task results of the processed tasks. Subsequently, a group of task results for the group of tasks may be received from the group of processing devices, and a job result for the job may be generated at least partly based on the group of task results. With example implementations of the present disclosure, usable computing resources in a plurality of different processing systems may be sufficiently utilized. More details on how to process the job will be described in detail with reference to FIG. 4.

Figure 4:
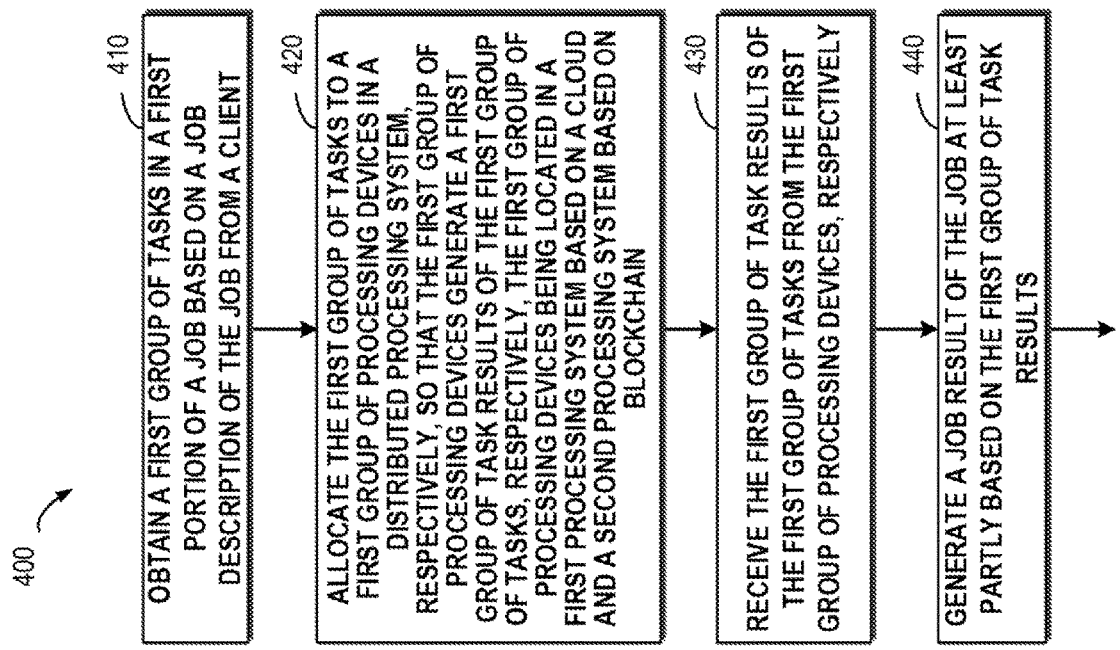
FIG. 4 schematically shows a flowchart of a method for processing a job according to example implementations of the present disclosure.

FIG. 4 schematically shows a flowchart of a method 400 for processing a job according to example implementations of the present disclosure. A job manager may be built to perform the method 400 according to example implementations of the present disclosure. Here, the job manager may run a program to perform various steps of the method 400. It will be understood that the present disclosure is not intended to limit where in the processing system the method 400 is performed. According to example implementations of the present disclosure, the job manager may be deployed in the cloud-based processing system 120 to perform various steps of the method 400. Since the processing system 120 has higher reliability and sufficient processing resources, running the job manager in the processing system 120 may guarantee that the job processing may be managed in a reliable and efficient way.

According to example implementations of the present disclosure, the job manager may be deployed in the blockchain-based processing system 210 to perform various steps of the method 400. By deploying the job manager in the processing system 210, it is possible to make use of idle resources in the processing system 210 as much as possible, reduce communication overheads between the job manager and various processing devices in the processing system 210 and further improve the performance of the processing job.

At block 410 in FIG. 4, a first group of tasks 332, . . . , and 334 in a first portion 330 of the job 320 may be obtained based on the job description 310 of the job 320 from a client. By analyzing the job description 310, the job 320 may be divided into a plurality of portions, and each portion may further be divided. Specifically, FIG. 5 schematically shows a block diagram 500 of a data structure of the job description 310 according to example implementations of the present disclosure.

Figure 5:
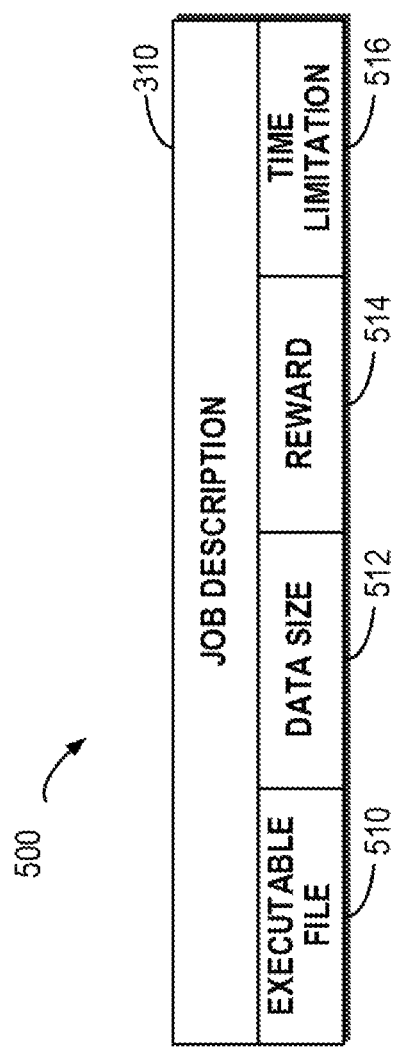
FIG. 5 schematically shows a block diagram of a data structure of a job description according to example implementations of the present disclosure.

As shown in FIG. 5, the job description 310 may comprise an executable file 510 to define a set of to-be-performed operations. By analyzing the executable file 510, content which needs to be performed in series may be treated as one portion. It will be understood that description is presented below by taking the first portion 330 in the job as an example, and other portions may be operated similarly. The first portion 330 may be divided so as to obtain a first group of tasks which may be executed in parallel. According to example implementations of the present disclosure, a to-be-performed operation may be described in the form of a directed acyclic graph, and the first group of tasks may be determined based on a temporal relationship described in the graph.

As shown in FIG. 5, the job description 310 may further comprise: data size 512 for indicating a data amount to be processed; a reward 514 for indicating a reward given to a processing device that executes a task related to the job; and a time limitation 516 for indicating time when a job result is desired to be obtained.

According to example implementations of the present disclosure, the client 110 may make a request for processing a job by issuing a new topic. A list of processing devices may be set, various processing devices in the list may subscribe to topics related to job processing, and a processing device of interest may participate in processing a task in the first group of tasks. Here the first group of tasks may be allocated to a group of processing devices in the processing systems 120 and 210. Specifically, at block 420, the first group of tasks are allocated to a first group of processing devices in the distributed processing system, respectively, so that the first group of processing devices generate a first group of task results for the first group of tasks, respectively, the first group of processing devices residing in a cloud-based first processing system and a blockchain-based second processing system, respectively. Returning to FIG. 3, here the first group of processing devices may comprise the processing device 122, . . . and the processing device 212, and the processing device 122 may reside in the processing system 120 while the processing device 212 may reside in the processing system 210.

It will be understood that since the cloud service-based processing system 120 has perfect functions for allocating and processing tasks, the following description will focus on more details about operations performed in the blockchain-based processing system 210. According to example implementations of the present disclosure, the first group of tasks which may be processed in parallel may be presented to various processing devices in the processing system 210. A processing device of interest may receive and execute a task.

Figure 6:
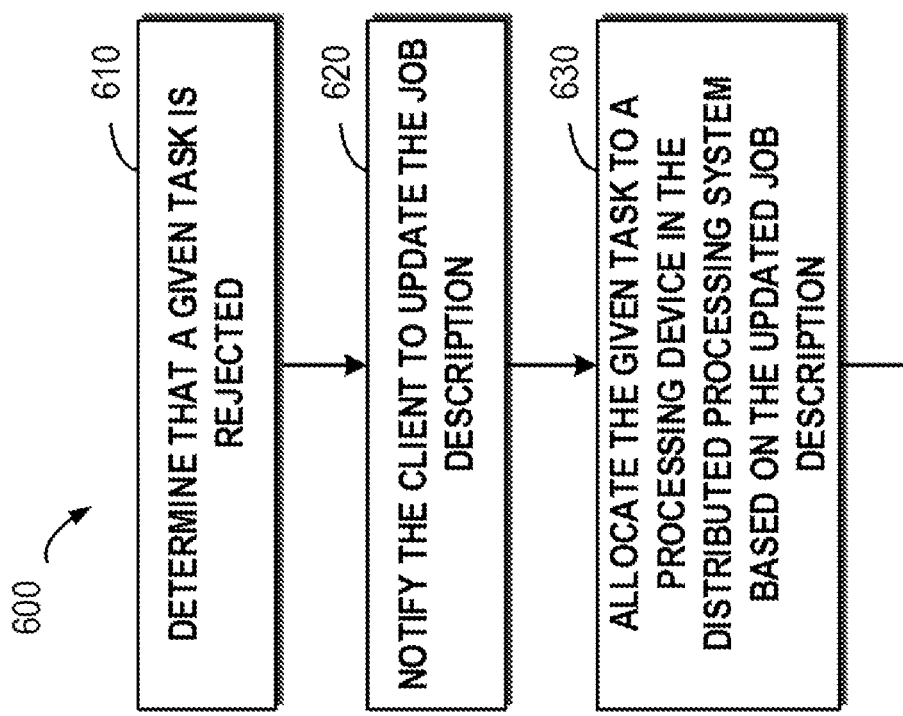
FIG. 6 schematically shows a flowchart of a method for processing a rejected task according to example implementations of the present disclosure.

According to example implementations of the present disclosure, in the process for allocating the first group of tasks, a task may be rejected, at which point the rejected task needs to be reallocated. It will be understood that various reasons may cause a task to be rejected. For example, there may be no idle processing device within a time period specified by the job description 310. In another example, the owner of a processing device may not be satisfied with a reward for accomplishing a task, etc. At this point, the task rejection needs to notify the client, so that an initiator of the job may adjust relevant content in the job description 310. With reference to FIG. 6, description is presented below to more details on how to process a rejected task.

FIG. 6 schematically shows a flowchart of a method 600 for processing a rejected task according to example implementations of the present disclosure. First of all, it may be determined whether a task is rejected. At block 610, if it is determined that the task is rejected, the method 600 proceeds to block 620 to notify the client 110 to update the job description 310. Here the job description 310 may comprise an agreement with a processing device that executes a relevant task of the job. For example, the agreement may comprise respective contents described with reference to FIG. 5: size of to-be-processed data, a reward for the job, time point when the job is desired to be completed, etc. According to example implementations of the present disclosure, the agreement here may be an agreement related to the whole job.

For example, suppose the job initiator specifies that a result is to be obtained within 1 hour, but currently there is no idle processing device, so the task is rejected. The job initiator may update content of the job description, for example, may modify the time limitation from 1 hour to 2 hours. In another example, suppose the owner of the processing device believes the reward provided by the initiator is too low, then the initiator may increase rewards. Subsequently at block 630, the rejected task may be reallocated to a processing device in the distributed processing system based on the updated job description from the client 110. Continuing the above example, since the initiator has updated the time limitation and/or increased rewards, when reallocating the rejected task, if there is a processing device that accepts the updated time limitation and/or rewards, then this processing device may accept the reallocated task.

According to example implementations of the present disclosure, a priority may be set to each processing device in the blockchain-based processing system 210. Based on priorities, processing device/devices may be selected to execute a task. According to example implementations of the present disclosure, a priority may be determined based on a time span for which a processing device is committed to serve the job. For example, a first priority may indicate that a processing device should not reject any task associated with the job. In other words, if a processing device has the first priority, then the processing device is not allowed to stop serving the job during the execution of the job (i.e., during the execution of various tasks in each portion of the job). As long as a task is allocated to the processing device, the processing device must accept the task. At this point, a long-term service agreement is established between a processing device with the first priority and the job.

According to example implementations of the present disclosure, since a processing device with the first priority always serves the job, the job manager may be deployed on the processing device with the first priority. In this way, the method 400 may run on a processing device that serves the job in the long-term, and further it may be guaranteed that the method 400 which is responsible for processing the job will not be interrupted.

A second priority may indicate that a processing device must execute at least two tasks associated with the job. At this point, a short-term service agreement is established between a processing device with the second priority and the job. After the processing device has processed two tasks, the processing device may choose to continue or exit the service. A third priority may indicate a processing device executes only one task associated with the job. At this point, a one-time service contract is established between a processing device with the third priority and the job. Once the processing device has processed one task, the processing device may no longer accept any task associated with the job.

In the initial stage after the job is started, each processing device in the processing system 210 may be inquired of which type of priority is selected. Suppose the processing device 212 has been idle for a long time, then the first priority may be assigned to the processing device 212; suppose the processing device 214 has a heavy workload, then the third priority may be assigned to the processing device 214; suppose a processing device has a medium workload, then the second priority may be assigned to this processing device. According to example implementations of the present disclosure, the first group of processing devices for processing the first group of tasks may be selected based on priorities of various processing devices.

Specifically, processing devices with the first priority may be selected first. Since such processing devices cannot reject any task related to the job, it may be ensured that rejection will not occur when allocating tasks to such processing devices. Further, where processing devices with the first priority are not sufficient, processing devices with the second priority may be selected. Where processing devices with the first priority and processing devices with the second priority are not sufficient, processing devices with the third priority may be selected. Since communicating and consulting with processing devices as to whether they accept tasks will cause extra overheads of time and processing resources, with example implementations of the present disclosure, tasks may be allocated to processing devices with a higher priority, which may reduce overheads for processing tasks and further improve efficiency.

It will be understood that the priority here is associated with a time period when the job is processed. Once the job is completed, the processing device is no longer needed to execute a task related to the job. According to example implementations of the present disclosure, if it is determined that all tasks associated with the job have been completed, processing devices with the first priority and the second priority may be notified to exit. At this point, the service period of processing devices for the job ends.

Suppose the processing device 212 in the processing system 210 has accepted a task, then the processing device 212 may perform processing based on the allocated task. It will be understood that the task is associated with specific to-be-processed data. Suppose the task is to calculate sales revenue of a product in a month, then to-be-processed raw data may be, for example, sales revenue of various shops in January, February, . . . , and December. According to example implementations of the present disclosure, a first group of data partitions associated with the first group of tasks may be generated based on raw data associated with the job. It will be understood that one data partition in the group of data partitions may correspond to one task allocated to one processing device. In other words, the processing device may execute the allocated task with respect to a data partition. Subsequently, each processing device may process sales revenue of one month.

Figure 7:
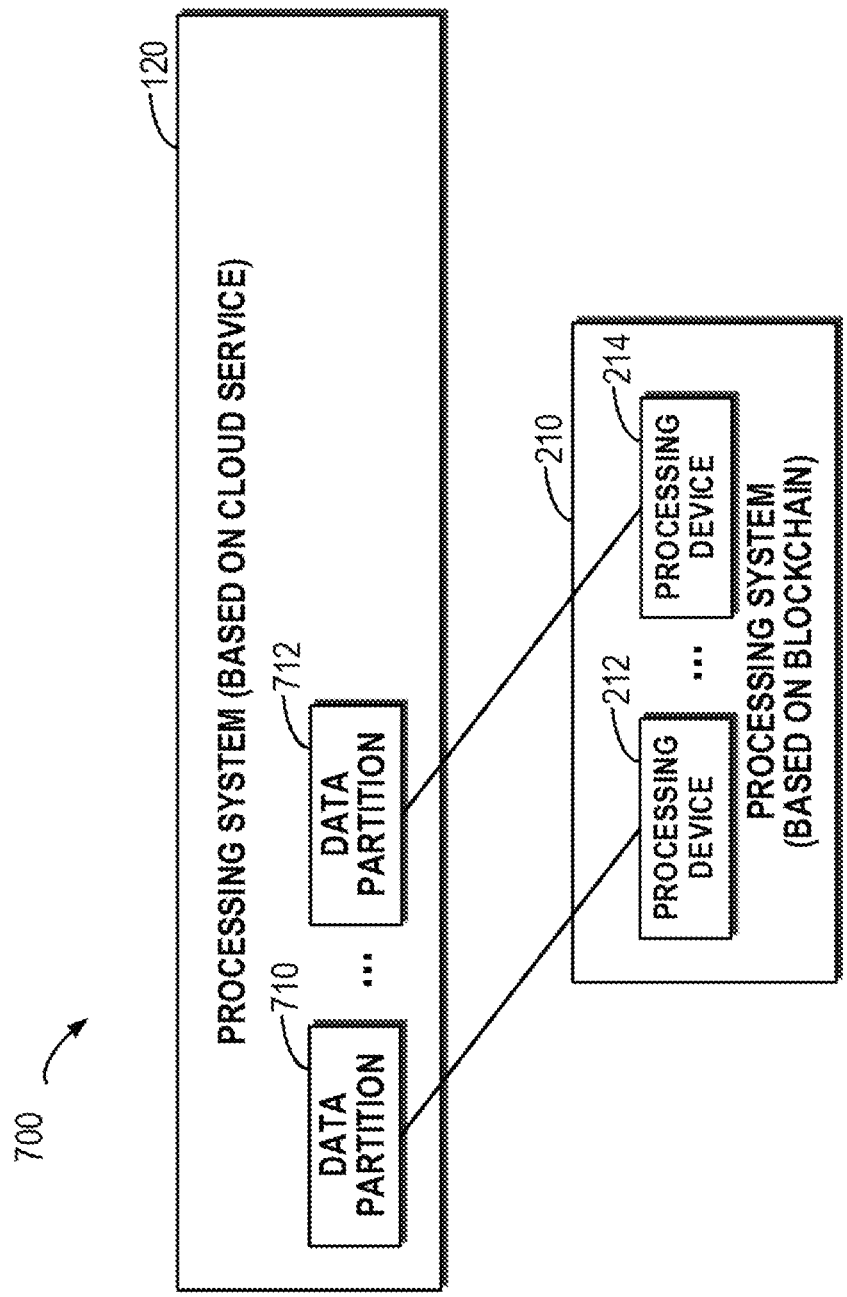
FIG. 7 schematically shows a block diagram for obtaining to-be-processed raw data according to example implementations of the present disclosure.

To ensure that various processing devices may obtain their respective to-be-processed raw data, the first group of data partitions may be stored to storage space accessible to these processing devices. Since the cloud service-based processing system 120 has higher stability and reliability together with large storage space, the first group of data partitions that are to be processed by the first group of processing devices may be stored to storage space in the processing system 120. At this point, when allocating the first group of tasks to the first group of processing devices in the distributed storage system, the first group of processing devices may be instructed to obtain the first group of data partitions from the storage space. Specifically, a processing device may be notified of an address where a data partition is stored (e.g., a path for accessing a data partition), so as to obtain the data partition. With reference to FIG. 7, description is presented below to more details on how to obtain data partitions.

FIG. 7 schematically shows a block diagram 700 for obtaining to-be-processed raw data according to example implementations of the present disclosure. As depicted, suppose a group of tasks are allocated to the processing devices 212, . . . , and 214 in the processing system 210, and a group of data partitions 710, . . . , and 712 corresponding to the group of tasks are stored to the processing system 120. At this point, the processing devices 212, . . . , and 214 may be notified to obtain corresponding data partitions based on a group of addresses of the data partitions 710, . . . , and 712 in the processing system 120. When addresses of to-be-processed data partitions have been obtained, the processing devices may obtain the to-be-processed data partitions based on the above address and execute allocated tasks with respect to the data partitions so as to generate corresponding task results.

It will be understood that since processing devices from persons and/or small organizations have lower security and are vulnerable to attacks from hackers or malware, the credibility of these processing devices may be low. Task results from these processing devices cannot be fully trusted, but additional verification needs to be provided, so as to ensure that task results from processing devices are really results of executing tasks with respect to data partitions.

According to example implementations of the present disclosure, double verification is provided with respect to a task result from a processing device in the blockchain-based processing system 210. First of all, in a first-level verification process, it may be determined whether the task result is trusted or not based on a computation verification rule. If the task result passes the first-level verification, this means the task result is trusted. If the task result does not pass the first-level verification, a voting process may be started so as to vote on the task result that does not pass the first verification. If a voting result satisfies a predetermined condition, then it may be considered that the task result is trusted, otherwise the task result may be marked as untrusted. More details about the voting operation will be described with reference to FIG. 8 below.

Figure 8:
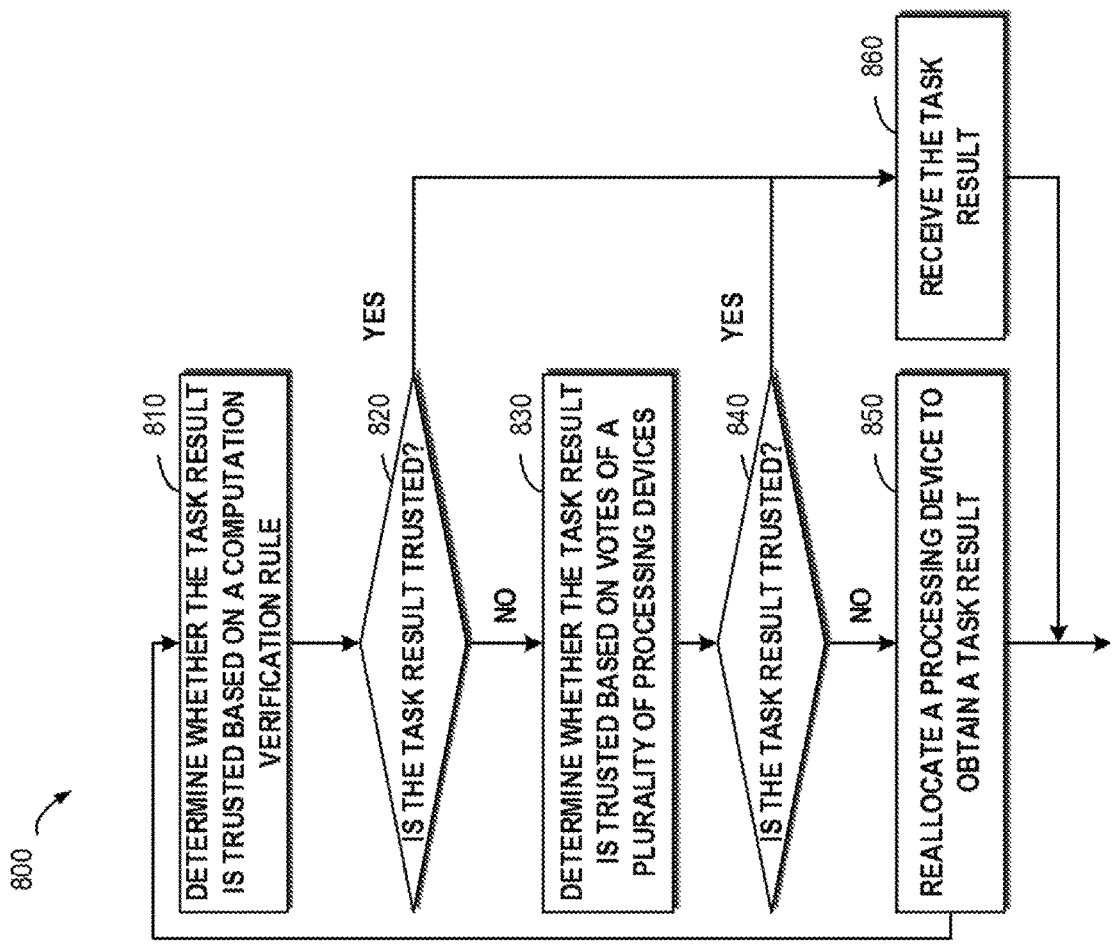
FIG. 8 schematically shows a flowchart of a method for verifying a task result according to example implementations of the present disclosure.

FIG. 8 schematically shows a flowchart of a method 800 for verifying a task result according to example implementations of the present disclosure. The method 800 may be performed on each task result obtained from a processing device in the blockchain-based processing system 210. As depicted, at block 810, it may be determined whether the task result is trusted or not based on the computation verification rule. Here the computation verification rule is a technical solution which has been proposed for verifying whether a computation result is trusted or not. In the context of the present disclosure, specific description of the computation verification rule is omitted. At block 820, if the task result passes the verification, it means the task result is trusted, and the method 800 may proceed to block 860, to receive the task result. If the task result does not pass the verification, it means the task result is untrusted, and the method 800 may proceed to block 830 so as to start the second-level verification.

At block 830, a request for confirming whether the task result is trusted or not may be sent to a plurality of processing devices. For example, a request for voting may be sent to the plurality of processing devices in the blockchain-based processing system 210. At this point, the plurality of processing devices may judge based on a predetermined algorithm whether the task result is a result obtained by executing allocated tasks with respect to data partitions, and the plurality of processing devices may return voting results based on their own judgment. If a plurality of votes from the plurality of processing devices satisfy a predetermined condition (e.g., more than 50% of votes are positive), then it may be determined that the task result is trusted.

At block 840, it may be determined whether the task result is trusted based on the output at block 830. If the task result passes the verification, it means the task result is trusted, and the method 800 may proceed to block 860, to receive the task result. If the task result does not pass the verification, it means the task result is untrusted, and the method 800 may proceed to block 850 so as to reallocate a task associated with the untrusted task result to a processing device in the distributed processing system. At this point, a processing device may be selected from the cloud service-based processing system 120, so as to ensure that a trusted task result may be obtained. According to example implementations of the present disclosure, the task may be allocated again to a processing device in the processing system 120.

By means of example implementations of the present disclosure, it may be ensured through double verification that the task resulting from processing devices of persons and/or small organizations is trusted. Further, when it is determined the task result is untrusted, a processing device may be reselected for processing a task, so as to ensure the job proceeds smoothly.

According to example implementations of the present disclosure, rewards may be offered to a processing device that has generated a trusted task result. For example, when a processing device receives a task, rewards may be promised to the processing device, for example, rewards may be set in a locked state. Once the task result provided by the processing device is verified as trusted, then rewards may be unlocked.

Where it has been determined that the task result is trusted, the processing device may write the task result to predetermined storage space and return an address of the task result in the storage space. According to example implementations of the present disclosure, the task result may be written to various locations. For example, the task result may be written to storage space in the cloud service-based processing system 120. Alternatively and/or additionally, the task result may be further written to local storage space of the processing device. Here the local storage space may be space in a memory of the processing device. Since the task result will be read by a subsequent task as input data, the task result residing on the local memory can reduce time overheads of reading input data.

Figure 9:
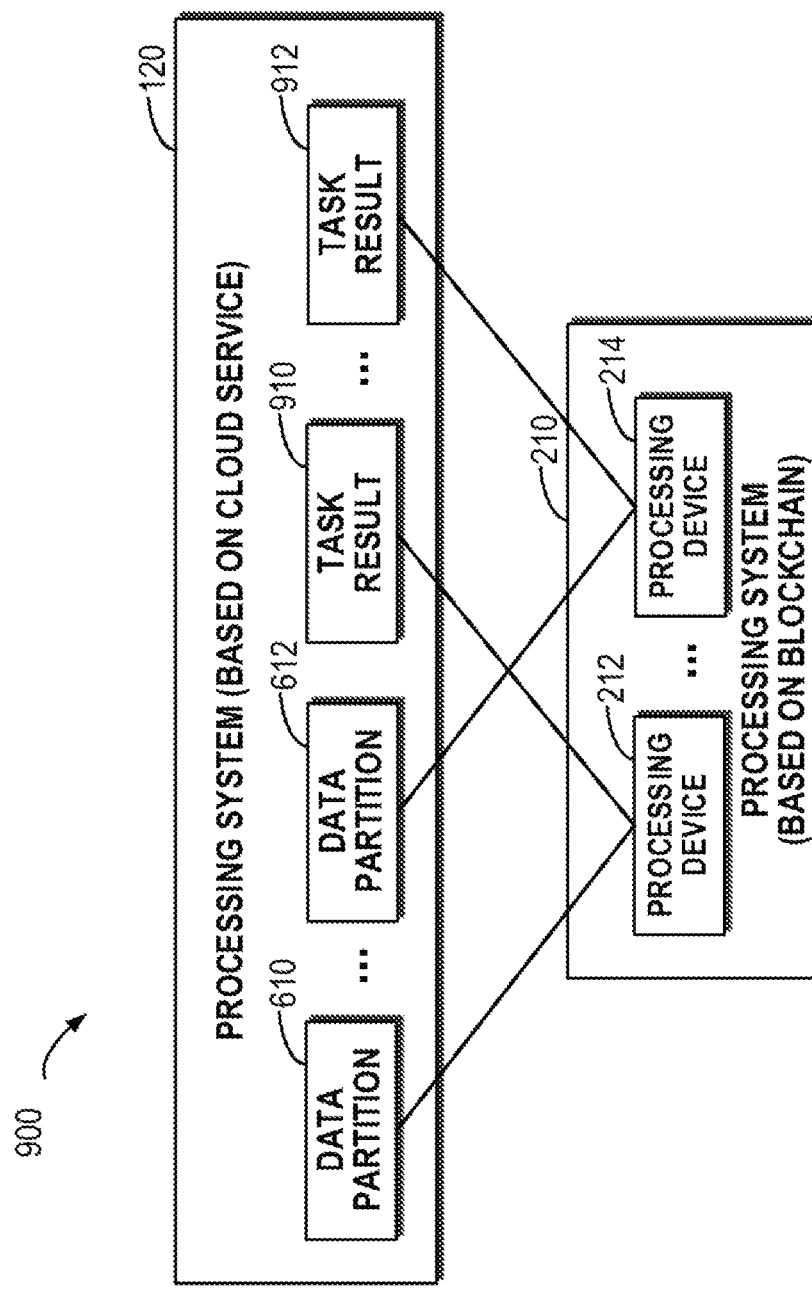
FIG. 9 schematically shows a block diagram for storing a task result according to example implementations of the present disclosure.

FIG. 9 schematically shows a block diagram 900 for storing a task result according to example implementations of the present disclosure. As depicted, based on an address of a data partition 610, the processing device 212 may obtain the data partition 610 and execute a task to obtain a task result. Since the cloud service-based processing system 120 has higher reliability and sufficient storage space, the processing device 212 may store an obtained task result 910 to the processing system 120. Similarly, the processing device 214 may obtain a data partition 612 and execute a task, and subsequently store a task result 912 to the processing system 120.

Figure 10:
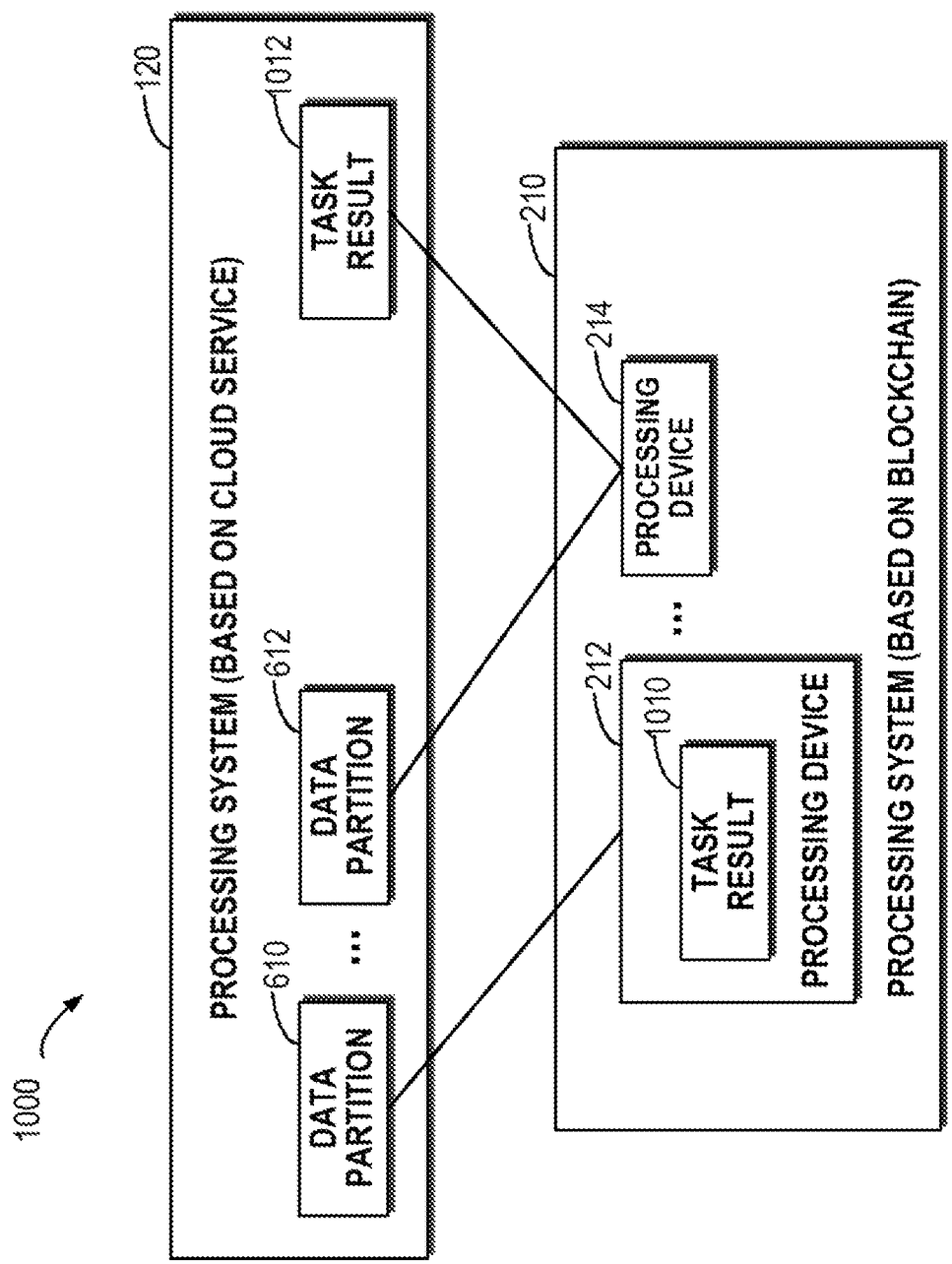
FIG. 10 schematically shows a block diagram for storing a task result according to example implementations of the present disclosure.

FIG. 10 schematically shows a block diagram 1000 for storing a task result according to example implementations of the present disclosure. As depicted, based on an address of the data partition 610, the processing device 212 may obtain the data partition 610 and execute a task to obtain a task result. Since the generated task result may be used as to-be-processed data of a subsequent task, and the subsequent task may be executed by the processing device 212 or others in the processing system 210, the processing device 212 may store an obtained task result 1010 to local storage space. With example implementations of the present disclosure, the frequent transmitting of task results and to-be-processed data between two processing systems may be effectively avoided. On the one hand, demands for bandwidth may be reduced, and on the other hand, time for data transmission may be shortened and further the performance of processing jobs may be improved.

Further, the processing device 214 may obtain the data partition 612 and execute a task. The processing device 214 may store an obtained task result 1012 to the processing system 120, so as to make sufficient use of storage space in the cloud service-based processing system 120.

With example implementations of the present disclosure, it may be determined based on a priority where the task result is to be stored. In general, since a processing device with a higher priority may be allocated with a task later, a task result generated by such a processing device may be stored to local storage space of the processing device. Since a processing device with a lower priority may not be allocated with a task later, a task result generated by such a processing device may be stored to the cloud service-based processing system 120.

According to example implementations of the present disclosure, if it is determined that a processing device in the first group of processing devices has any of the first priority and the second priority, the processing device may be instructed to store a task result generated by itself to storage space of the processing device. With example implementations of the present disclosure, even if a subsequent task is allocated to another processing device, since both of the other processing device and to-be-processed data of the subsequent task are within the processing system 210, the frequent transmitting of a task result and a to-be-processed data partition between two processing systems 120 and 210 may be avoided.

According to example implementations of the present disclosure, if it is determined that a processing device in the first group of processing devices has the third priority, the processing device may be instructed to store a task result generated by itself to storage space in the processing system 120. With example implementations of the present disclosure, it is possible to make sufficient use of high reliability and abundant storage space of the processing system 120.

No matter where the task result is stored, a result address may be used to indicate a path for accessing the task result. The processing device may return an address pointing to the generated task result, so that the subsequent operating procedure may access the task result. Returning to FIG. 4, a first group of task results of the first group of tasks may be received from the first group of processing devices at block 430, respectively. Here, a relevant task result may be obtained based on an address of the task result.

At block 440, a job result of the job may be generated at least partly based on the first group of task results. It will be understood that since the job may involve one or more portions, if the job only involves the first portion described above, then a job result of the whole job may be generated based on the obtained first group of task results. If the job involves a plurality of portions, then subsequent second, third portions and the like may be processed similarly.

According to example implementations of the present disclosure, a second group of tasks in the second portion of the job may be obtained based on the job description 310. The second group of tasks may be allocated to a second group of processing devices in the distributed processing system, respectively, so that the second group of processing devices generate a second group of task results of the second group of tasks, respectively. The second group of task results of the second group of tasks may be received from the second group of processing devices, respectively. Subsequently, a job result may be generated at least partly based on the second group of task results.

It will be understood that to-be-processed data of the second group of tasks is generated based on the first group of task results. At this point, a second group of addresses of a second group of data partitions that are to be processed by the second group of processing devices may be determined based on the first group of result addresses of the first group of task results.

In general, for each task in the second group of tasks, a plurality of task results of the first group of tasks need to be received. Suppose the first group of task results are locally stored in processing devices, then a task in the second group of tasks may be allocated to the same processing device as that in the first group of processing devices. At this point, the processing device may quickly read a portion of to-be-processed data from its own local storage space, and the processing device may further read another portion of the to-be-processed data from local storage space of another processing device. With example implementations of the present disclosure, it is possible to make use of local storage space of a processing device as much as possible, so as to avoid frequently writing and/or reading data between two processing systems. Specifically, a second group of data partitions to be processed by the second group of processing devices may be generated based on the job description 310. For example, a plurality of addresses of a plurality of task results from the first group of processing devices may be transmitted to a processing device for executing a task in the second group of tasks. Subsequently, the processing device may obtain a to-be-processed data partition based on the plurality of addresses and further execute the task with respect to the obtained data partition and generate a task result.

With example implementations of the present disclosure, on the one hand, it is possible to make use of processing capacities of processing devices in the blockchain based processing system 210 as much as possible, and on the other hand storage space in these processing devices may be utilized as much as possible, and further various overheads of data transmission may be reduced and the efficiency of job processing may be improved.

While examples of the method according to the present disclosure have been described in detail with reference to FIGS. 2 to 10, description is presented below to the implementation of a corresponding apparatus. According to example implementations of the present disclosure, an apparatus is provided for processing a job. The apparatus comprises: an obtaining module configured to obtain a first group of tasks in a first portion of a job based on a job description of the job from a client; an allocating module configured to allocate the first group of tasks to a first group of processing devices in a distributed processing system, respectively, so that the first group of processing devices generate a first group of task results of the first group of tasks, respectively, the first group of processing devices being located in a first processing system based on a cloud and a second processing system based on blockchain; a receiving module configured to receive the first group of task results of the first group of tasks from the first group of processing devices, respectively; and a generating module configured to generate a job result of the job at least partly based on the first group of task results.

According to example implementations of the present disclosure, the receiving module comprises: a verifying module configured to, in accordance with determining that a task result in the first group of task results is from a processing device in the second processing system, determine whether the task result is trusted based on a computation verification rule; and a result receiving module configured to receive the task result in accordance with determining that the task result is trusted.

According to example implementations of the present disclosure, the receiving module further comprises: a voting module configured to, in accordance with determining that the task result is untrusted, notify a plurality of processing devices in the second processing system to send a request for voting whether the task result is trusted; and a vote processing module configured to determine that the task result is trusted, in accordance with determining that a plurality of votes from the plurality of processing devices satisfy a predetermined condition.

According to example implementations of the present disclosure, the apparatus further comprises: a reallocating module configured to, in accordance with determining that the task result is untrusted, reallocate a task associated with the untrusted task result to a processing device in the distributed processing system.

According to example implementations of the present disclosure, the apparatus comprises a notifying module configured to, in accordance with determining that a task in the first group of tasks is rejected, notify the client to update the job description, the job description comprising an agreement with a processing device that executes a relevant task of the job; and a reallocating module configured to allocate the rejected task to a processing device in the distributed processing system based on the updated job description from the client.

According to example implementations of the present disclosure, the apparatus further comprises: a data partitioning module configured to generate a first group of data partitions associated with the first group of tasks based on raw data associated with the job, respectively; and a storage module configured to store the first group of data partitions to storage space in the first processing system.

According to example implementations of the present disclosure, the allocating module comprises: an instructing module configured to instruct the first group of processing devices to obtain the first group of data partitions from the storage space, respectively.

According to example implementations of the present disclosure, the receiving module comprises: an address module configured to, with respect to a task in the first group of tasks, receive a result address associated with a task result of the task from the first group of processing devices; and a result obtaining module configured to obtain the task result based on the result address.

According to example implementations of the present disclosure, the apparatus further comprises a setting module configured to set a priority to a processing device in the second processing system.

According to example implementations of the present disclosure, the priority comprises at least one of: a first priority for indicating that the processing device is not allowed to refuse to process any task associated with the job; a second priority for indicating that the processing device must process at least two tasks associated with the job; and a third priority for indicating that the processing device only processes one task associated with the job.

According to example implementations of the present disclosure, the allocating module comprises: a selecting module configured to select the first group of processing devices based on priorities of various processing devices in the second processing system.

According to example implementations of the present disclosure, the apparatus comprises: a first instructing module configured to, in accordance with determining that a processing device in the first group of processing devices has any of the first priority and the second priority, instruct the processing device to store a task result generated by the processing device to storage space of the processing device.

According to example implementations of the present disclosure, the apparatus comprises: a second instructing module configured to, in accordance with determining that a processing device in the first group of processing devices has the third priority, instruct the processing device to store a task result generated by the processing device to storage space in the first processing system.

According to example implementations of the present disclosure, the obtaining module is further configured to obtain a second group of tasks in a second portion of the job based on the job description; the allocating module is further configured to allocate the second group of tasks to a second group of processing devices in the distributed processing system, respectively; the receiving module is further configured to receive a second group of task results of the second group of tasks from the second group of processing devices, respectively; and the generating module is further configured to generate the job result at least partly based on the second group of task results.

According to example implementations of the present disclosure, the apparatus further comprises: an address generating module configured to determine a second group of addresses of a second group of data partitions to be processed by the second group of processing devices, based on a first group of result addresses of the first group of task results, respectively; and an address instructing module configured to instruct the second group of processing devices to execute the second group of tasks based on the second group of addresses, respectively.

According to example implementations of the present disclosure, the apparatus is implemented on a processing device in the second processing system.

According to example implementations of the present disclosure, the apparatus is implemented on a processing device with the first priority.

Figure 11:
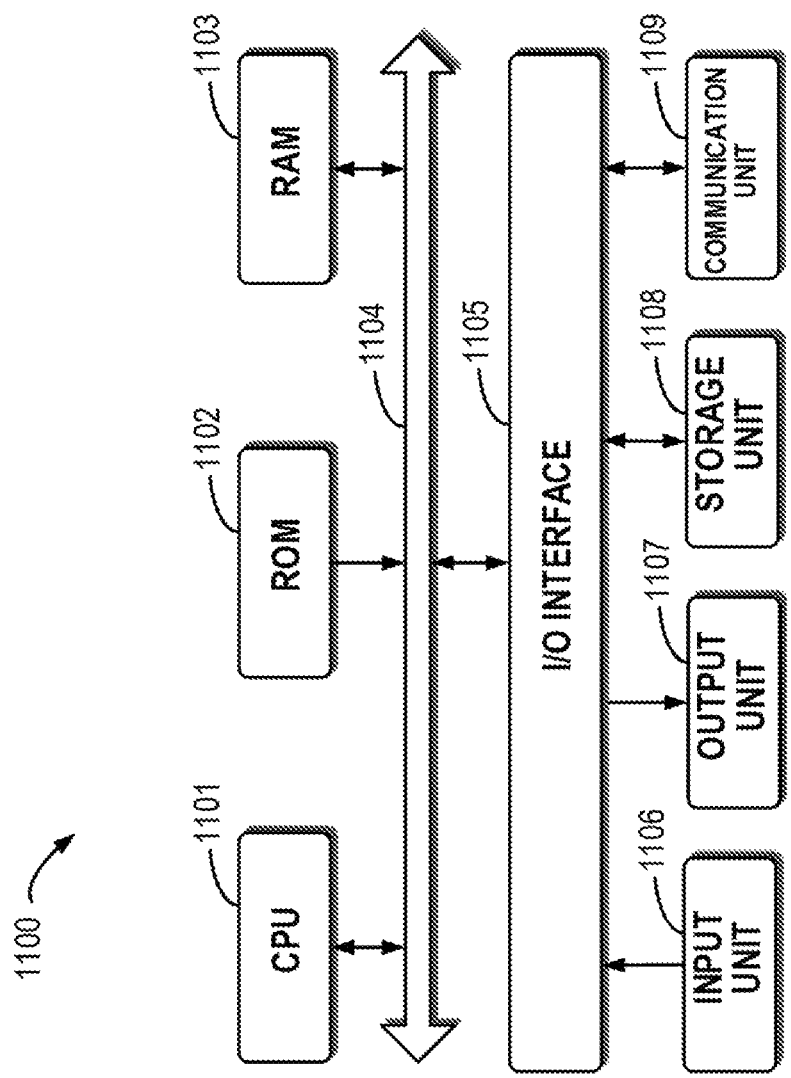
FIG. 11 schematically shows a block diagram of a device for processing a job according to example implementations of the present disclosure.

FIG. 11 schematically shows a block diagram of a device 1100 for managing an application system according to example implementations of the present disclosure. As depicted, the device 1100 includes a central processing unit (CPU) 1101, which can execute various suitable actions and processing based on the computer program instructions stored in the read-only memory (ROM) 1102 or computer program instructions loaded in the random-access memory (RAM) 1103 from a storage unit 1108. The RAM 1103 can also store all kinds of programs and data required by the operations of the device 1100. CPU 1101, ROM 1102 and RAM 1103 are connected to each other via a bus 1104. The input/output (I/O) interface 1105 is also connected to the bus 1104.

A plurality of components in the device 1100 are connected to the I/O interface 1105, including: an input unit 1106, such as a keyboard, mouse and the like; an output unit 1107, e.g., various kinds of displays and loudspeakers etc.; a storage unit 1108, such as a magnetic disk and optical disk, etc.; and a communication unit 1109, such as a network card, modem, wireless transceiver and the like. The communication unit 1109 allows the device 1100 to exchange information/data with other devices via the computer network, such as Internet, and/or various telecommunication networks.

The above described process and treatment, such as the methods 400, 600 and 800 can also be executed by the processing unit 1101. For example, in some implementations, the methods 400, 600 and 800 can be implemented as a computer software program tangibly included in the machine-readable medium, e.g., the storage unit 1108. In some implementations, the computer program can be partially or fully loaded and/or mounted to the device 1100 via ROM 1102 and/or the communication unit 1109. When the computer program is loaded to the RAM 1003 and executed by the CPU 1101, one or more steps of the above described methods 400, 600 and 800 can be implemented. Alternatively, in other implementations, the CPU 1101 can also be configured in other suitable ways to realize the above procedure/method.

According to example implementations of the present disclosure, an electronic device is provided, the electronic device comprising: at least one processor; and a memory coupled to the at least one processor, the memory having instructions stored thereon, the instructions, when executed by the at least one processor, causing the device to perform acts. The acts include: obtaining a first group of tasks in a first portion of a job based on a job description of the job from a client; allocating the first group of tasks to a first group of processing devices in a distributed processing system, respectively, so that the first group of processing devices generate a first group of task results of the first group of tasks, respectively, the first group of processing devices being located in a first processing system based on a cloud and a second processing system based on blockchain; receiving the first group of task results of the first group of tasks from the first group of processing devices, respectively; and generating a job result of the job at least partly based on the first group of task results.

According to example implementations of the present disclosure, receiving the first group of task results of the first group of tasks from the first group of processing devices, respectively comprises: in accordance with determining that a task result in the first group of task results is from a processing device in the second processing system, determining whether the task result is trusted based on a computation verification rule; and receiving the task result in accordance with determining that the task result is trusted.

According to example implementations of the present disclosure, the acts further comprise: in accordance with determining that the task result is untrusted, notifying a plurality of processing devices in the second processing system to send a request for voting whether the task result is trusted; and determining that the task result is trusted, in accordance with determining that a plurality of votes from the plurality of processing devices satisfy a predetermined condition.

According to example implementations of the present disclosure, the acts further comprise: in accordance with determining that the task result is untrusted, reallocating a task associated with the untrusted task result to a processing device in the distributed processing system.

According to example implementations of the present disclosure, the acts further comprise: in accordance with determining that a task in the first group of tasks is rejected, notifying the client to update the job description, the job description comprising an agreement with a processing device that executes a relevant task of the job; and allocating the rejected task to a processing device in the distributed processing system based on the updated job description from the client.

According to example implementations of the present disclosure, the acts further comprise: generating a first group of data partitions associated with the first group of tasks based on raw data associated with the job, respectively; and storing the first group of data partitions to storage space in the first processing system.

According to example implementations of the present disclosure, allocating the first group of tasks to the first group of processing devices in the distributed processing system, respectively comprises: instructing the first group of processing devices to obtain the first group of data partitions from the storage space, respectively.

According to example implementations of the present disclosure, receiving the first group of task results of the first group of tasks from the first group of processing devices, respectively comprises: with respect to a task in the first group of tasks, receiving a result address associated with a task result of the task from the first group of processing devices; and obtaining the task result based on the result address.

According to example implementations of the present disclosure, the acts further comprise: setting a priority to a processing device in the second processing system.

According to example implementations of the present disclosure, the priority comprises at least one of: a first priority for indicating that the processing device is not allowed to refuse to process any task associated with the job; a second priority for indicating that the processing device must process at least two tasks associated with the job; and a third priority for indicating that the processing device only processes one task associated with the job.

According to example implementations of the present disclosure, allocating the first group of tasks to the first group of processing devices in the distributed processing system, respectively comprises: selecting the first group of processing devices based on priorities of various processing devices in the second processing system.

According to example implementations of the present disclosure, the acts further comprise at least one of: in accordance with determining that a processing device in the first group of processing devices has any of the first priority and the second priority, instructing the processing device to store a task result generated by the processing device to storage space of the processing device; and in accordance with determining that a processing device in the first group of processing devices has the third priority, instructing the processing device to store a task result generated by the processing device to storage space in the first processing system.

According to example implementations of the present disclosure, generating the job result of the job at least partly based on the first group of task results comprises: obtaining a second group of tasks in a second portion of the job based on the job description; allocating the second group of tasks to a second group of processing devices in the distributed processing system, respectively; receiving a second group of task results of the second group of tasks from the second group of processing devices, respectively; and generating the job result at least partly based on the second group of task results.

According to example implementations of the present disclosure, the acts further comprise: determining a second group of addresses of a second group of data partitions to be processed by the second group of processing devices, based on a first group of result addresses of the first group of task results, respectively; and instructing the second group of processing devices to execute the second group of tasks based on the second group of addresses, respectively.

According to example implementations of the present disclosure, the acts are performed on a processing device in the second processing system.

According to example implementations of the present disclosure, the acts are performed on a processing device with the first priority.

According to example implementations of the present disclosure, there is provided a computer program product. The computer program product is tangibly stored on a non-transitory computer-readable medium and comprises machine-executable instructions which are used to implement the method according to the present disclosure.

According to example implementations of the present disclosure, there is provided a computer-readable medium. The computer-readable medium has machine-executable instructions stored thereon, the machine-executable instructions, when executed by at least one processor, causing the at least one processor to implement the method according to the present disclosure.

The present disclosure can be a method, device, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but is not limited to, an electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, RAM, ROM, erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where a remote computer is involved, the remote computer can be connected to the user computer via any type of network, including local area network (LAN) and wide area network (WAN), or to the external computer (e.g., connected via Internet using an Internet service provider). In some implementations, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow charts and/or block diagrams of method, apparatus (system) and computer program products according to implementations of the present disclosure. It should be understood that each block of the flow charts and/or block diagrams and the combination of various blocks in the flow charts and/or block diagrams can be implemented by computer-readable program instructions.

The computer-readable program instructions can be provided to the processing unit of a general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular way, such that the computer-readable medium stored with instructions contains an article of manufacture, including instructions for implementing various aspects of the functions/actions stipulated in one or more blocks of the flow chart and/or block diagram.

The computer-readable program instructions can also be loaded into a computer, other programmable data processing apparatuses or other devices, so as to execute a series of operation steps on the computer, the other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow charts and block diagrams in the drawings illustrate system architecture, functions and operations that may be implemented by system, method and computer program products according to a plurality of implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order depending on the functions involved. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the explained various implementations, will be apparent to those skilled in the art. The selection of terms in the text aims to best explain principles and actual applications of each implementation and technical improvements made in the market by each implementation, and to otherwise enable those of ordinary skill in the art to understand implementations of the present disclosure.

What is claimed is:

1. A method for processing a job, the method comprising:
   obtaining a first group of tasks in a first portion of a job based on a job description of the job from a client;

allocating the first group of tasks to a first group of processing devices in a distributed processing system, respectively, so that the first group of processing devices generate a first group of task results of the first group of tasks, respectively, the first group of processing devices being located in a first processing system based on a cloud and a second processing system based on blockchain;

receiving the first group of task results of the first group of tasks from the first group of processing devices, respectively; and generating a job result of the job at least partly based on the first group of task results;

wherein allocating the first group of tasks to the first group of processing devices in the distributed processing system, respectively, comprises:

selecting a given number of processing devices in the first group of processing devices located in the second processing system based on priorities of various processing devices in the second processing system to allocate at least a portion of the first group of tasks; and wherein the priorities of various processing devices in the second processing system comprise:

a first priority for indicating that the processing device is not allowed to refuse to process any task associated with the job; and a second priority for indicating that the processing device must process at least two tasks associated with the job.

2. The method of claim 1, wherein receiving the first group of task results of the first group of tasks from the first group of processing devices, respectively comprises: in accordance with determining that a task result in the first group of task results is from a processing device in the second processing system, determining whether the task result is trusted based on a computation verification rule; and receiving the task result in accordance with determining that the task result is trusted.

3. The method of claim 2, further comprising:

in accordance with determining that the task result is untrusted, notifying a plurality of processing devices in the second processing system to send a request for voting whether the task result is trusted; and determining that the task result is trusted, in accordance with determining that a plurality of votes from the plurality of processing devices satisfy a predetermined condition.

4. The method of claim 2, wherein further comprising:

in accordance with determining that the task result is untrusted, reallocating a task associated with the untrusted task result to a processing device in the distributed processing system.

5. The method of claim 1, further comprising: in accordance with determining that a task in the first group of tasks is rejected, notifying the client to update the job description, the job description comprising an agreement with a processing device that executes a relevant task of the job; and allocating the rejected task to a processing device in the distributed processing system based on the updated job description from the client.

6. The method of claim 1, further comprising:

generating a first group of data partitions associated with the first group of tasks based on raw data associated with the job, respectively; and storing the first group of data partitions to storage space in the first processing system.

7. The method of claim 6, wherein allocating the first group of tasks to the first group of processing devices in the distributed processing system, respectively, comprises: instructing the first group of processing devices to obtain the first group of data partitions from the storage space, respectively.

8. The method of claim 7, wherein receiving the first group of task results of the first group of tasks from the first group of processing devices, respectively comprises: with respect to a task in the first group of tasks, receiving a result address associated with a task result of the task from the first group of processing devices; and obtaining the task result based on the result address.

9. The method of claim 1, wherein the priorities of various processing devices in the second processing system further comprise a third priority for indicating that the processing device only processes one task associated with the job.

10. The method of claim 9, further comprising at least one of:

in accordance with determining that a processing device in the first group of processing devices has any of the first priority and the second priority, instructing the processing device to store a task result generated by the processing device to storage space of the processing device; and in accordance with determining that a processing device in the first group of processing devices has the third priority, instructing the processing device to store a task result generated by the processing device to storage space in the first processing system.

11. The method of claim 10, wherein generating the job result of the job at least partly based on the first group of task results comprises:

obtaining a second group of tasks in a second portion of the job based on the job description;

allocating the second group of tasks to a second group of processing devices in the distributed processing system, respectively;

receiving a second group of task results of the second group of tasks from the second group of processing devices, respectively; and generating the job result at least partly based on the second group of task results.

12. The method of claim 11, further comprising:

determining a second group of addresses of a second group of data partitions to be processed by the second group of processing devices, based on a first group of result addresses of the first group of task results, respectively; and instructing the second group of processing devices to execute the second group of tasks based on the second group of addresses, respectively.

13. The method of claim 1, wherein the method is performed on a processing device with the first priority.

14. The method of claim 1, wherein the method is performed on a processing device in the second processing system.

15. An electronic device, comprising:

at least one processor; and a memory coupled to the at least one processor, the memory having instructions stored thereon, the instructions, when executed by the at least one processor, causing the electronic device to implement acts comprising:

obtaining a first group of tasks in a first portion of a job based on a job description of the job from a client;

allocating the first group of tasks to a first group of processing devices in a distributed processing system, respectively, so that the first group of processing devices generate a first group of task results of the first group of tasks, respectively, the first group of processing devices being located in a first processing system based on a cloud and a second processing system based on blockchain;

receiving the first group of task results of the first group of tasks from the first group of processing devices, respectively; and generating a job result of the job at least partly based on the first group of task results;

wherein allocating the first group of tasks to the first group of processing devices in the distributed processing system, respectively, comprises:

selecting a given number of processing devices in the first group of processing devices located in the second processing system based on priorities of various processing devices in the second processing system to allocate at least a portion of the first group of tasks; and wherein the priorities of various processing devices in the second processing system comprise:

a first priority for indicating that the processing device is not allowed to refuse to process any task associated with the job; and a second priority for indicating that the processing device must process at least two tasks associated with the job.

16. The electronic device of claim 15, wherein receiving the first group of task results of the first group of tasks from the first group of processing devices, respectively comprises: in accordance with determining that a task result in the first group of task results is from a processing device in the second processing system, determining whether the task result is trusted based on a computation verification rule; and receiving the task result in accordance with determining that the task result is trusted.

17. The electronic device of claim 16, further comprising:

in accordance with determining that the task result is untrusted, notifying a plurality of processing devices in the second processing system to send a request for voting whether the task result is trusted; and determining that the task result is trusted, in accordance with determining that a plurality of votes from the plurality of processing devices satisfy a predetermined condition.

18. A computer program product, tangibly stored on a non-transitory computer-readable medium and comprising machine-executable instructions, which when executed by a processor of an electronic device, cause the electronic device to perform steps of:

obtaining a first group of tasks in a first portion of a job based on a job description of the job from a client;

allocating the first group of tasks to a first group of processing devices in a distributed processing system, respectively, so that the first group of processing devices generate a first group of task results of the first group of tasks, respectively, the first group of processing devices being located in a first processing system based on a cloud and a second processing system based on blockchain;

receiving the first group of task results of the first group of tasks from the first group of processing devices, respectively; and generating a job result of the job at least partly based on the first group of task results;

wherein allocating the first group of tasks to the first group of processing devices in the distributed processing system, respectively, comprises:

selecting a given number of processing devices in the first group of processing devices located in the second processing system based on priorities of various processing devices in the second processing system to allocate at least a portion of the first group of tasks; and wherein the priorities of various processing devices in the second processing system comprise:

a first priority for indicating that the processing device is not allowed to refuse to process any task associated with the job; and a second priority for indicating that the processing device must process at least two tasks associated with the job.

19. The computer program product of claim 18, wherein receiving the first group of task results of the first group of tasks from the first group of processing devices, respectively comprises: in accordance with determining that a task result in the first group of task results is from a processing device in the second processing system, determining whether the task result is trusted based on a computation verification rule; and receiving the task result in accordance with determining that the task result is trusted.

20. The computer program product of claim 18, wherein:

the first group of processing devices comprises a first plurality of processing devices located in the first processing system based on the cloud and a second plurality of processing devices located in the second processing system based on blockchain, the second processing system being different than the first processing system; and the first group of task results comprises at least a first task result from at least one of the first plurality of processing devices located in the first processing system and a second task result from at least one of the second plurality of processing devices located in the second processing system.

\* \* \* \* \*